United States Patent
Drepper

(10) Patent No.: US 8,429,629 B2
(45) Date of Patent: Apr. 23, 2013

(54) IN-KERNEL VIRTUAL MACHINE FOR LOW OVERHEAD STARTUP AND LOW RESOURCE USAGE

(75) Inventor: Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1586 days.

(21) Appl. No.: 11/289,401

(22) Filed: Nov. 30, 2005

(65) Prior Publication Data

US 2007/0169070 A1   Jul. 19, 2007

(51) Int. Cl.
*G06F 9/45* (2006.01)
*G06F 9/44* (2006.01)
*H04L 29/06* (2006.01)

(52) U.S. Cl.
USPC ............ 717/148; 717/131; 717/166; 713/164

(58) Field of Classification Search ......................... None
See application file for complete search history.

(56) References Cited

U.S. PATENT DOCUMENTS

| | | | | |
|---|---|---|---|---|
| 5,815,415 A * | 9/1998 | Bentley et al. | ................... | 703/4 |
| 5,987,523 A | 11/1999 | Hind et al. | | |
| 6,021,469 A | 2/2000 | Tremblay et al. | | |
| 6,075,938 A | 6/2000 | Bugnion et al. | | |
| 6,321,377 B1 * | 11/2001 | Beadle et al. | ................. | 717/148 |
| 6,324,685 B1 * | 11/2001 | Balassanian | ................... | 717/118 |
| 6,397,242 B1 | 5/2002 | Devine et al. | | |
| 6,510,352 B1 | 1/2003 | Badavas et al. | | |
| 6,513,158 B1 * | 1/2003 | Yogaratnam | ................... | 717/166 |
| 6,571,274 B1 * | 5/2003 | Jacobs et al. | ................... | 709/203 |
| 6,658,654 B1 * | 12/2003 | Berry et al. | ................... | 717/131 |
| 6,675,230 B1 | 1/2004 | Lewallen | | |
| 6,854,123 B1 | 2/2005 | Lewallen | | |
| 6,934,761 B1 * | 8/2005 | Curtis | ........................ | 709/237 |
| 6,948,160 B2 * | 9/2005 | Click et al. | .................... | 717/148 |
| 6,957,439 B1 | 10/2005 | Lewallen | | |
| 6,961,941 B1 * | 11/2005 | Nelson et al. | ................. | 719/319 |
| 7,020,738 B2 | 3/2006 | Neiger et al. | | |
| 7,035,963 B2 | 4/2006 | Neiger et al. | | |
| 7,409,487 B1 * | 8/2008 | Chen et al. | ........................ | 711/6 |
| 7,478,373 B2 | 1/2009 | Bond et al. | | |
| 7,480,908 B1 | 1/2009 | Tene et al. | | |
| 7,530,059 B2 * | 5/2009 | Kielstra et al. | ................. | 717/148 |
| 7,644,271 B1 * | 1/2010 | Cherepov et al. | ............. | 713/164 |
| 8,024,563 B1 * | 9/2011 | Belgaied et al. | .............. | 713/164 |
| 2002/0099863 A1 | 7/2002 | Comeau et al. | | |

(Continued)

OTHER PUBLICATIONS

Mitchem et al., Using Kernel Hypervisors to Secure Applications. In Proceedings of the 13th Annual Computer Security Applications Conference, Dec. 1997, IEEE Computer Society, pp. 175-181.*

(Continued)

*Primary Examiner* — Thuy Dao
(74) *Attorney, Agent, or Firm* — Lowenstein Sandler LLP

(57) ABSTRACT

Embodiments of the present invention provide an architecture for efficiently loading and executing byte code generated from a general programming language. In particular, a byte code interpreter implements a virtual machine that executes the byte code and is divided into a kernel component and one or more user components. The kernel component of the virtual machine is integrated into the operating system kernel. The user component runs in the same virtual address space as the applet, provides support for executing an applet and couples the applet to the operating system. In addition, the kernel component of the virtual machine may share code with multiple user components.

17 Claims, 4 Drawing Sheets

U.S. PATENT DOCUMENTS

| | | | |
|---|---|---|---|
| 2002/0122055 A1* | 9/2002 | Parupudi et al. | 345/737 |
| 2002/0161909 A1* | 10/2002 | White | 709/231 |
| 2003/0097360 A1 | 5/2003 | McGuire et al. | |
| 2003/0126187 A1 | 7/2003 | Won et al. | |
| 2003/0135509 A1* | 7/2003 | Davis et al. | 707/100 |
| 2003/0149966 A1 | 8/2003 | McGuire | |
| 2003/0149967 A1 | 8/2003 | Kamada et al. | |
| 2003/0163711 A1* | 8/2003 | Grawrock | 713/189 |
| 2003/0204838 A1* | 10/2003 | Caspole et al. | 717/130 |
| 2004/0064819 A1* | 4/2004 | LaVoie et al. | 719/310 |
| 2004/0158830 A1* | 8/2004 | Chung et al. | 718/1 |
| 2004/0216096 A1 | 10/2004 | Messer et al. | |
| 2004/0261069 A1* | 12/2004 | Verbeke et al. | 717/166 |
| 2005/0108699 A1* | 5/2005 | Olander et al. | 717/166 |
| 2005/0188382 A1 | 8/2005 | Nagendra et al. | |
| 2005/0262138 A1 | 11/2005 | Hartel et al. | |
| 2006/0064545 A1* | 3/2006 | Wintergerst | 711/130 |
| 2006/0070051 A1* | 3/2006 | Kuck et al. | 717/162 |
| 2006/0190934 A1* | 8/2006 | Kielstra et al. | 717/148 |
| 2006/0259292 A1* | 11/2006 | Solomon et al. | 703/27 |
| 2007/0074192 A1* | 3/2007 | Geisinger | 717/148 |
| 2007/0083862 A1 | 4/2007 | Wooldridge et al. | |
| 2009/0172665 A1* | 7/2009 | Tene et al. | 718/1 |

OTHER PUBLICATIONS

Santhanam, Towards Linux 2.6, IBM developerWorks, Sep. 23, 2003, pp. 1-19.*

KVM: Kernel-based Virtualization Driver, White Paper, Qumranet, 2006, retrieved Feb. 17, 2010 from <http://web.archive.org/web/20070108015503/www.qumranet.com/wp/kvm_wp.pdf>, pp. 1-5.*

KVM—Kernel Based Virtual Machine, Red Hat, 2009, retrieved Feb. 17, 2010 from <http://www.redhat.com/f/pdf/rhev/DOC-KVM.pdf>, pp. 1-11.*

Butt et al., The performance impact of kernel prefetching on buffer cache replacement algorithms, Jun. 2005, 12 pages, <http://delivery.acm.org/10.1145/1070000/1064231/p157-butt.pdf>.*

Baker et al., A Java embedded micro-kernel infrastructure, Nov. 2002, 1 page, <http://delivery.acm.org/10.1145/590000/583836/p224-baker.pdf>.*

Co-pending U.S. Appl. No. 11/289,402, entitled "Purpose Domain for Low Overhead Virtual Machines" filed Nov. 30, 2005.

Co-pending U.S. Appl. No. 11/289,406, entitled "Purpose Domain for In-Kernel Virtual Machine for Low Overhead Startup and Low Resource Usage" filed Nov. 30, 2005.

Whitaker, Andrew, Richard S. Cox, Marianne Shaw and Steven D. Gribble. "Rethinking the Design of Virtual Machine Monitors." IEEE Journal, May 2005, pp. 57-62.

Rosenblum, Mendel and Tal Garfinkel. "Virtual Machine Monitors: Current Technology and Future Trends." IEEE Journal, May 2005, pp. 39-47.

Engler et al, "Exokernel: An Operating System Architecture for Application-Level Resource Management", 1995, ACM, pp. 251-266.

Whitaker et al, "Scale and Performance in the Denali Isolation Kernel", 2002, ACM, pp. 195-209.

Back et al, "The KaffeOS Java Runtime System", Jul. 2005, ACM, pp. 583-630.

Whitaker et al, "Denali: a scalable isolation kernel", 2002, ACM, pp. 10-15.

Thekkath et al., "Hardware and Software Support for Efficient Exception Handling", 1994, ACM, pp. 110-119.

Erlingsson et al., "Virtual Environment for Unreliable Extensions", Jun. 2005, pp. 1-11 including cover page.

* cited by examiner

IN-KERNEL VIRTUAL MACHINE FOR LOW OVERHEAD STARTUP AND LOW RESOURCE USAGE

FIELD OF THE INVENTION

The present invention relates generally to applications that run based on byte code generated from a general purpose programming languages.

BACKGROUND OF THE INVENTION

Today, there are many applications that are written in general purpose programming languages. A desired characteristic of these applications is platform independence. That is, an application can be written once and executed on multiple computer platforms. With the advent of the Internet and widespread use of web application and browsing, such applications have become widely accepted. For example, languages, such as JAVA, have become very successful with server-side applications, such as web services, or servlets.

Platform independence for an application written in a general purpose programming language is achieved by compiling the language code "halfway" into an intermediate form known as byte code. A special program, known as a byte code interpreter, runs on the host computer system. The byte code interpreter implements a virtual machine on which the byte code is interpreted. Alternatively the byte code can be translated into usable native code that can be executed by the host computer system. Standardized libraries may also be installed on a host computer system to provide access to features, such as graphics and networking.

Unfortunately, applications that are compiled into byte code suffer from high startup overhead and may consume a large amount of resources during operation. When a user runs multiple JAVA applications concurrently in different instances of the JAVA virtual machine (JVM), there tends to be substantial duplication of effort in each JVM. For example, when multiple applications are executed concurrently, each has to load, parse, verify, and create runtime representations of all the applications' classes, even such common ones as java.lang.Object. Application start-up time, memory footprint, and raw execution time are thus negatively impacted. Developers who try to circumvent the problem by using class loaders soon discover that they provide inadequate inter-application isolation and make it difficult to cleanly terminate applications.

Accordingly, it may be desirable to provide systems and methods that can efficiently run interpreted language applications. It may also be desirable to provide systems and methods that can efficiently startup interpreted language applications.

SUMMARY OF THE INVENTION

In accordance with one feature of the invention, a computer comprises a processor and an operating system having a kernel. A first portion of a virtual machine resides in the kernel and is configured to load byte code.

In accordance with another feature of the invention, a method of starting an applet on a computer is provided. Hardware of the computer is accessed through an operating system and the operating system comprises a first portion of a virtual machine in the kernel of the operating system. A request to start an applet is received and an address space for the applet is created. A second portion of the virtual machine is mapped into the newly created address space for the applet. The second portion operates in the address space of the applet and is configured to interpret byte code generated for a general purpose programming language.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Embodiments of the present invention provide an architecture for efficiently executing byte code generated from a general purpose programming language. In particular, a byte code interpreter implementing a virtual machine that executes byte code is divided into a kernel component and one or more user level components. The kernel component of the virtual machine is integrated into the operating system kernel. The user level component provides support for execution of an applet and couples the applet to the operating system. In addition, the kernel may share the same copy of the user level component of the virtual machine with multiple processes.

Reference will now be made in detail to exemplary embodiments of the invention, which are illustrated in the accompanying drawings. Wherever possible, the same reference numbers will be used throughout the drawings to refer to the same or like parts.

Figure 1:
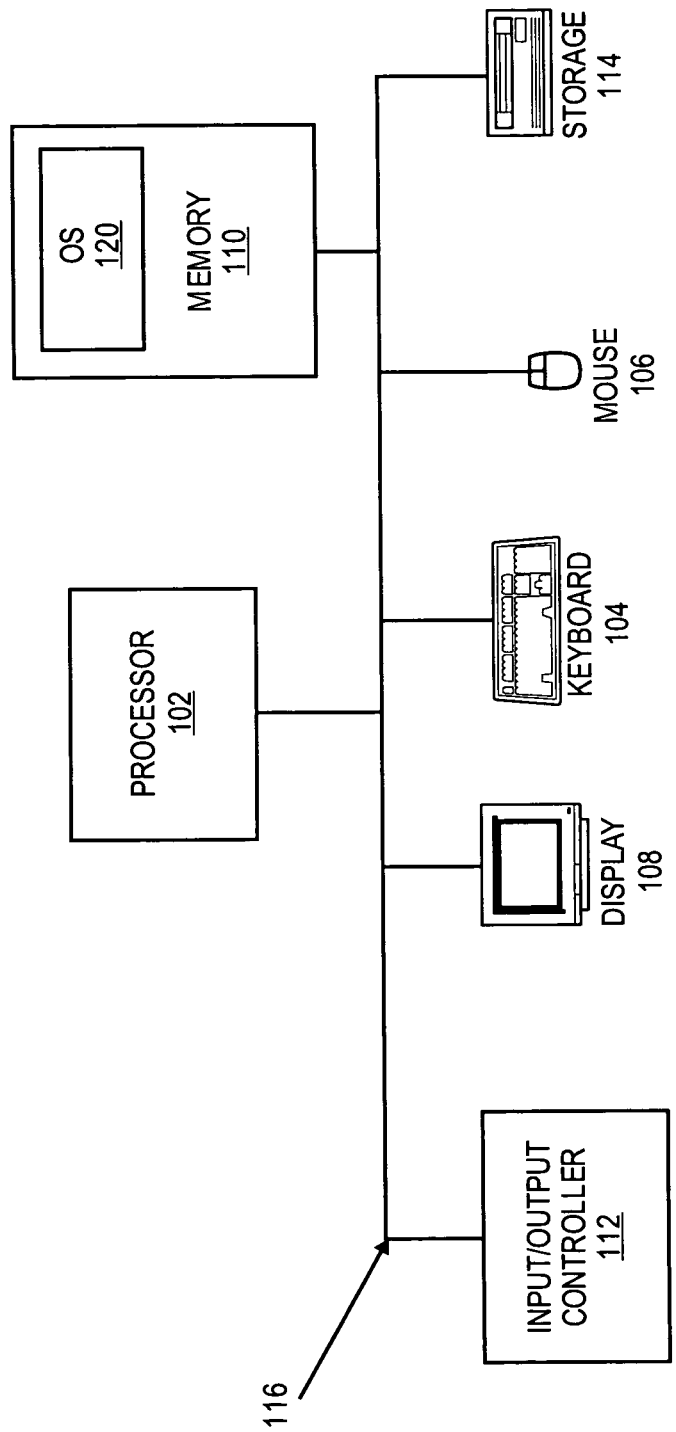
FIG. 1 illustrates a computer system that is consistent with embodiments of the present invention.

FIG. 1 illustrates a computer system 100 that is consistent with embodiments of the present invention. In general, embodiments of the present invention may be implemented in various computer systems, such as a personal computer, server, workstation, and the like. However, for purposes of explanation, system 100 is shown as a general purpose computer that is well known to those skilled in the art. Examples of the components that may be included in system 100 will now be described.

As shown, computer system 100 may include a central processor 102, a keyboard 104, a pointing device 106 (e.g., mouse, or the like), a display 108, a main memory 110, an input/output controller 112, and a storage device 114. System 100 may also be provided with additional input/output devices, such as a printer (not shown). The various components of the system 100 communicate through a system bus 116 or similar architecture. In addition, computer system 100 may include an operating system (OS) 120 that resides in memory 110 during operation.

Main memory 110 may also serve as a primary storage area of computer system 100 and hold data that are actively being used by applications and processes running on processor 102. Memory 110 may be implemented as a random access memory or other form of memory, which are well known to those skilled in the art.

OS 120 is an integrated collection of routines and programs that are responsible for the direct control and management of hardware in system 100 and system operations. Additionally, OS 120 provides a foundation upon which to run application software and applets. For example, OS 120 may perform services, such as resource allocation, scheduling, input/output control, and memory management. OS 120 may be predominantly software, but may also comprise partial or complete hardware implementations and firmware. Well known examples of operating systems that are consistent with the principles of the present invention include LINUX, MAC OS by APPLE INC., SOLARIS by SUN MICROSYSTEMS, and WINDOWS by MICROSOFT CORPORATION.

Figure 2:
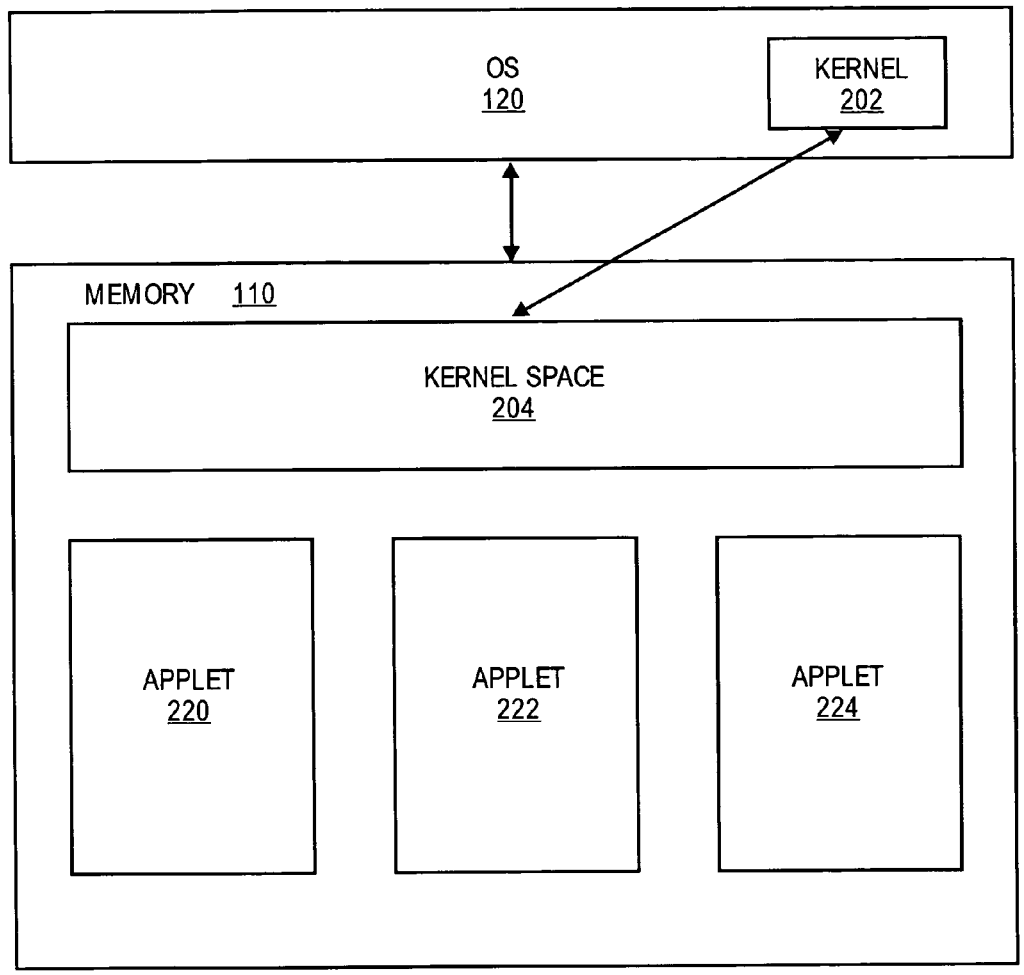
FIG. 2 illustrates a relationship between the memory and the operating system of the computer system shown in FIG. 1.

Reference will now be made to FIG. 2 to illustrate the general relationship between memory 110 and OS 120. As shown, OS 120 may support processes running applets 220, 222, and 224. Accordingly, at least some portion of applets 220, 222, and 224 are shown occupying space in memory 110. One skilled in the art will recognize that data for applets 220, 222, and 224 may also be swapped in/out of memory 110 to/from other storage locations, such as storage 114.

OS 120 may further comprise a kernel 202. Kernel 202 is the core of OS 120 and assists in providing access to memory 110 and to the processes running on computer system 100, including the processes running applets 220, 222, and 224. Kernel 202 may also provide low level services, such as thread management, address space management, direct memory access, interprocess communication, basic runtime libraries, and the like.

In some embodiments, kernel 202 may directly access or reside in a kernel space 204 of memory 110 that is reserved for the use of kernel 202, device drivers supported by kernel 202, and any kernel extensions.

However, OS 120 may also employ virtual memory techniques for its process and address space handling. Virtual memory techniques allow processes to run in a memory address space that is independent of the physical constraints of memory 110. Thus, OS 120 may use virtual memory techniques to map virtual address ranges used in processes (such as the processes running applets 220, 222, and 224) to the physical addresses in memory 110.

Applets 220, 222, and 224 are software components that sometimes may run inside the context of another program (not shown), for example a web browser, or through a plugin, or a variety of other applications that support an applet programming model. Applets 220, 222, and 224 may usually have some form of user interface or perform a particular piece of the overall user interface, such as in a web page. Applets 220, 222, and 224 may also have the capability of interacting with and/or influencing their host program. Common examples for applets 220, 222, 224 are JAVA applets, C# applets, and flash movies, and the like. One skilled in the art will appreciate that embodiments of the present invention may also support applications that run on byte code generated from general purpose programming languages, such as JAVA or C#.

In some embodiments, the process and address space handling of OS 120 allows for the sharing of class runtime representations across multiple processes executing applets. When code is generated and loaded for one application or applet, another application or applet can use that information without having to engage in file fetching, parsing, and verifying. For example, in some embodiments, a byte code interpreter may comprise two basic components to implement a virtual machine (VM) for executing the byte code of applets. One component of the byte code interpreter (a "VM kernel module") may reside in kernel space 204 of memory 110. A second component (a "VM user module") may be mapped into user-level processes.

In some embodiments, OS 120 may provide a byte code interpreter that implements a VM using VM kernel module 208 and VM user modules 214, 216, and 218. VM kernel module 208 may reside in kernel space 204 and may be responsible for generating and loading the byte code generated for a general purpose programming language, such as JAVA or C#. VM kernel module 204 may also comprise a just-in-time (JIT) compiler 206. JIT compiler 206 allows VM kernel module 204 to translate bytecode into native machine code at runtime. JIT compiler 206 may compile bytecode on a per-file or per-function basis.

Figure 3:
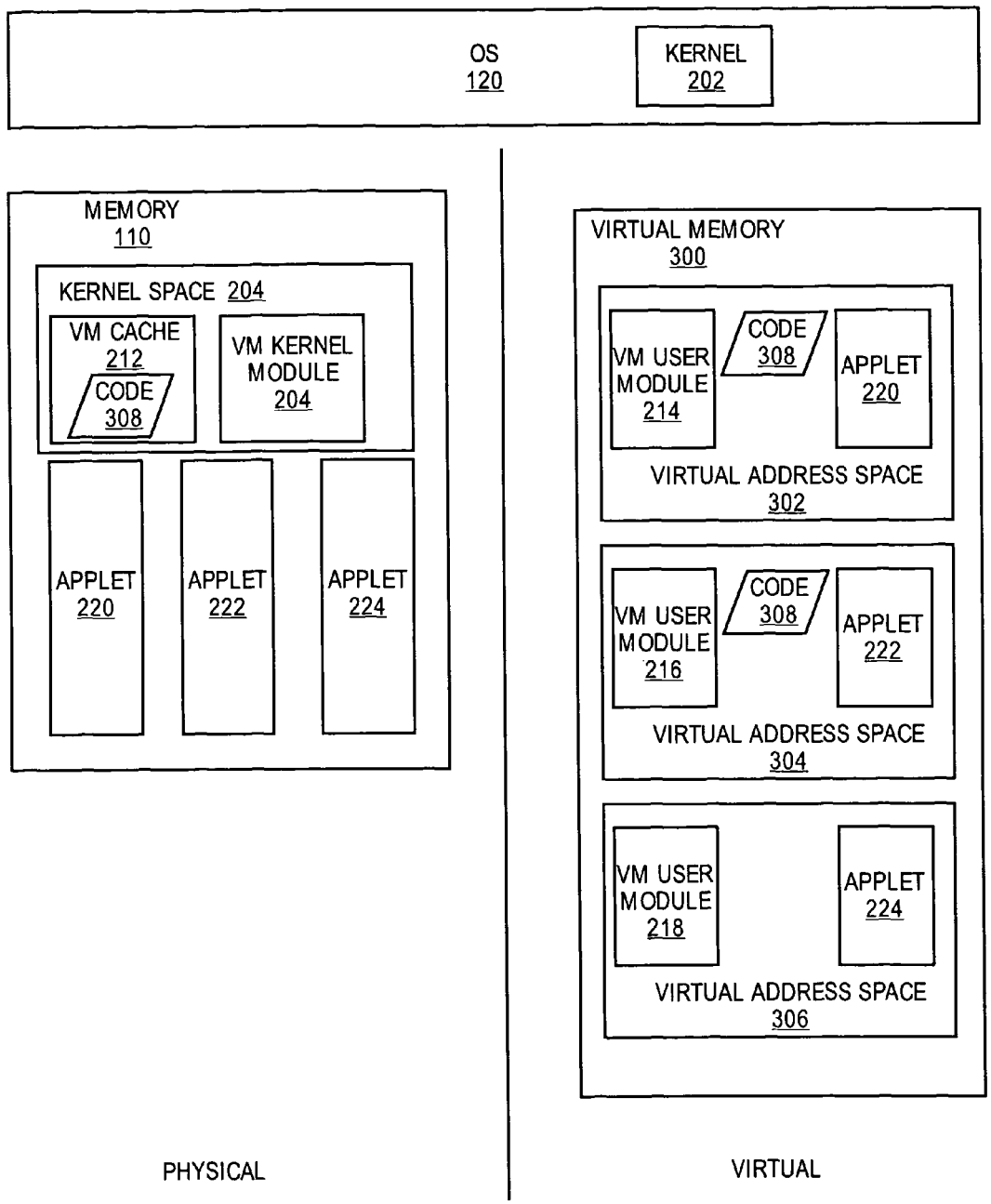
FIG. 3 illustrates the process and address space handling of the operating system of the computer system shown in FIG. 1.

In contrast, VM user modules 214, 216, and 218 are user-level components of the byte code interpreter that reside in the same virtual address space as the applet. Thus, FIG. 3 shows VM user modules 214, 216, and 218 residing in virtual address spaces 302, 304, and 306 created for applets 220, 222, and 224 respectively. VM user modules 214, 216, and 218 serve as the portion of the VM that executes byte code for an application or applet. In some embodiments, VM user modules 214, 216, and 218 execute in separate address spaces of virtual memory. However, VM user modules 214, 216, and 218 may use one or more of the same portions of physical memory 110. One benefit of this architecture is that VM user modules 214, 216, and 218 may be located in the same locations of physical memory 110 for their respective processes.

OS 120 may also provide a VM cache 212 in kernel space 204 to assist the operations of the byte code interpreter. In some embodiments, information across processes executing applets can be shared using VM cache 212. For example, VM cache 212 may hold runtime representation of loaded classes and dynamically generated native code. Over time as different applications and applets load and generate code, VM cache 212 eventually becomes filled with classes and compiled native code that are most frequently used. VM cache 212 may be implemented as an extension of a file system cache, which is well known to those skilled in the art.

In some embodiments, VM cache 212 allows VM kernel module 204 to preserve and reuse the code generated from JIT compiler 206. Thus, in these embodiments, VM kernel module 204 may avoid repetitive runs of JIT compiler 206, if the same code is used in more than one applet. For example, as shown in FIG. 3, VM cache 212 is shown holding applet code 308, which has been shared with applets 220 and 222.

Figure 4:
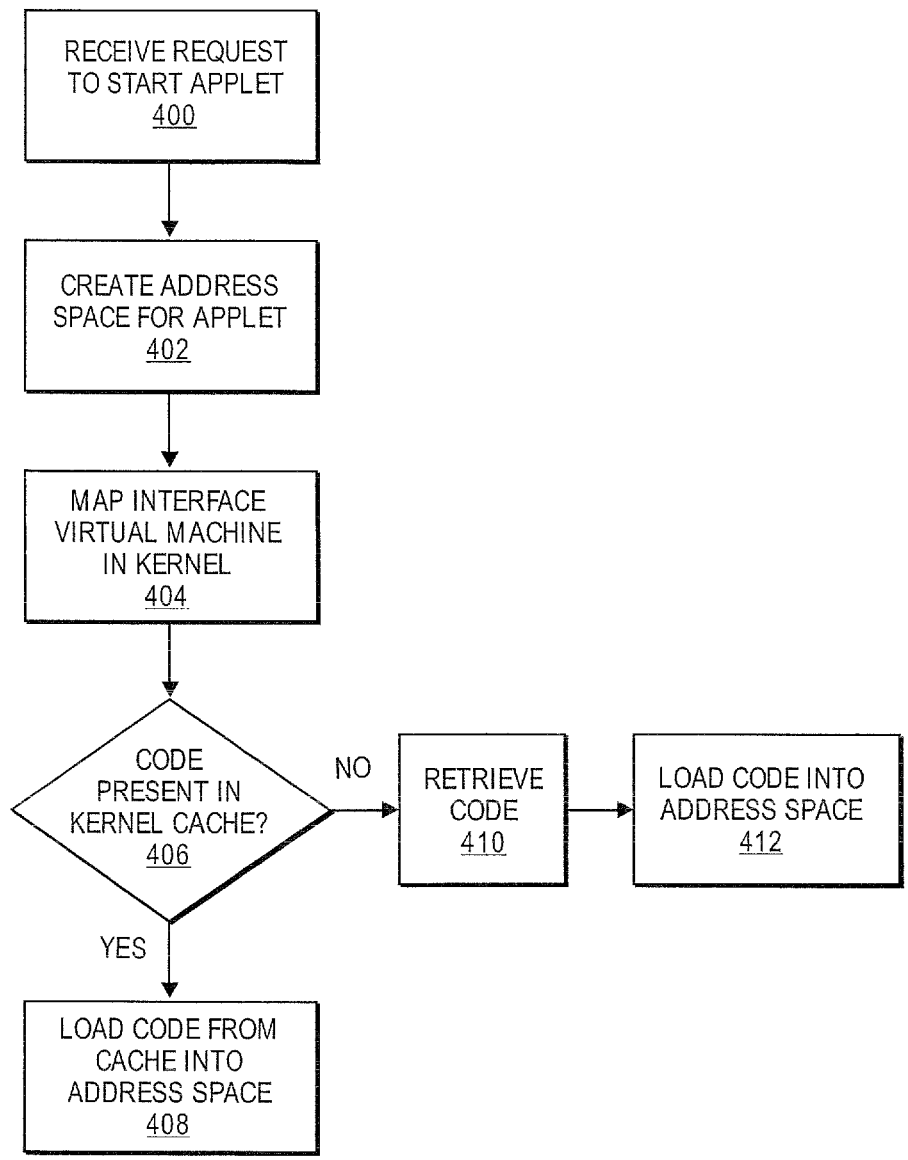
FIG. 4 illustrates an exemplary process flow starting an applet that is in accordance with embodiments of the present invention.

FIG. 4 illustrates an exemplary process flow starting an applet that is in accordance with embodiments of the present invention. Instead of generating and loading code for an applet at the user level, the exemplary process flow utilizes a kernel module, i.e., VM kernel module 204. VM kernel module 204 enables sharing of VM cache 212 to avoid reloading data and running JIT compiler 206. One skilled in the art will recognize that this reduces the startup cost of an applet since all that has to happen at startup is that code that is cached in VM cache 212 can be quickly mapped to the applet's stack. Control is then transferred to the respective VM user module that operates as a user level process.

If the code is not found in VM cache 212, then VM kernel module 204 may load and build the requested code and then store it in VM cache 212 for the benefit of subsequent applets. Over time, VM kernel module 204 can easily make available a broad set of classes and compiled methods. Therefore, the exemplary process described below effectively amortizes the class loading and dynamic compilation costs of starting new applets. The exemplary process flow shown in FIG. 4 will now be further described.

In stage 400, system 100 receives a request to start an applet, such as a JAVA or C# applet. For example, a user running may commence a web browsing session that requests an applet that is displayed in a web page on display 108. The request is eventually passed to VM kernel module 204. For purposes of explanation, it is assumed that the request relates to starting applet 220. Processing may then flow to stage 402.

In stage 402, VM kernel module 204 instructs kernel 202 to create virtual address space 302 in virtual memory 300 for applet 220. In stage 404, kernel 202 interfaces VM user module 214 with VM kernel module 204 in response to the request to start applet 220. As noted above, VM user module 214 operates in virtual address space 302 of applet 220. Processing may then flow to stage 406.

In stage 406, VM kernel module 204 determines whether code for applet 220 is present in VM cache 212. If the code is found in VM cache 212, then processing may flow to stage 408. If the code is not found, then processing may flow to stage 310.

In stage 408, VM kernel module 204 loads the appropriate code for applet 220 from VM 212 cache into virtual address space 302 of applet 220. Of note, VM kernel module 204 is able to efficiently locate and load this code because it is at the same address of physical memory 110 from prior uses. VM user module 214 may then retrieve the code and perform the operations for starting and executing applet 220 as a user level process.

In stage 410, VM kernel module 204 retrieves the code, for example, remotely via a network or from a file stored on storage 114. As noted, VM kernel module 204 may then store this newly retrieved code into VM cache 212 for the benefit of other applets that may request it. If needed, this caching allows the code to be stored at one location in physical memory 110 but also allows it to be shared across multiple processes executing in user space 214. Processing may then flow to stage 412.

In stage 412, VM kernel module 204 loads the code into the address space of applet 220 in virtual address space 302. VM user module 214 may then retrieve the code and perform the operations for starting and executing applet 220 as a user level process.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of starting applets on a computer, the method executed by a processor of the computer, the method comprising:

accessing, by the processor, hardware of the computer through a kernel of an operating system, wherein a kernel component of a virtual machine resides in a kernel space of the operating system and maintains a cache in the kernel space, the cache being configured to store executable applet code that is shared among the applets;

creating a first address space for a first applet in a user space provided by the operating system, wherein executable applet code for the first applet is stored in the cache in the kernel space by the kernel component and wherein the executable applet code is a shared copy of executable code that resides in identical locations of a shared portion of a physical memory associated with the kernel component;

executing a first user component of the virtual machine in the first address space; and mapping the first user component to the kernel component, wherein the kernel component provides the executable applet code stored in the cache for the first applet to the first user component and the first user component executes the first applet in the first address space.

2. The method of claim 1, further comprising:

sharing executable applet code loaded in a physical memory of the computer between the applets, wherein the shared executable applet code is loaded into the physical memory by the kernel component.

3. The method of claim 2, wherein the first applet is executed by the first user component based on the shared executable applet code.

4. The method of claim 1, further comprising:

implementing the first user component in the first address space using a shared copy of component code that is shared with another user component of the virtual machine.

5. The method of claim 1, further comprising switching context between the first applet and another applet by reusing a portion of the first address space.

6. The method of claim 1, further comprising:

determining that the executable applet code for the first applet is present in the cache; and loading the executable applet code for the first applet by the kernel component into the first address space.

7. The method of claim 1, further comprising:

determining that the executable applet code for the first applet is not present in the cache;

retrieving the executable applet code for the first applet by the kernel component;

loading the retrieved executable applet code by the kernel component into the first address space; and storing the retrieved executable applet code in the cache.

8. The method of claim 4, wherein the shared copy of the component code is loaded into a shared portion of a physical memory of the computer by the kernel component.

9. The method of claim 8, wherein the shared copy of the component code implements a byte code interpreter in the first address space.

10. A computer comprising:

a processor;

an operating system coupled to the processor and comprising a kernel;

a cache residing in a kernel space of the operating system;

a kernel component of a virtual machine residing in the kernel space and configured to load executable applet code for a plurality of applets into the cache in the kernel space, wherein the cache is configured to store the executable applet code and that is shared among the plurality of applets and wherein the executable applet code is a shared copy of executable code that resides in identical locations of a shared portion of a physical memory associated with the kernel component; and a non-kernel component of the virtual machine coupled to the kernel component and residing in an address space separate from the kernel space, wherein the non-kernel component accesses hardware of the computer through the kernel and is configured to execute the shared executable applet code received from the kernel component in the address space.

11. The computer of claim 10, wherein the non-kernel component comprises a byte code interpreter that executes the at least one of the plurality of applets based on the executable applet code received from the kernel space.

12. The computer of claim 10, wherein the non-kernel component is implemented using a shared copy of component code that resides in a shared portion of a physical memory.

13. The computer of claim 12, wherein the shared copy of the component code further comprises code implementing a byte code interpreter that runs in the address space of the non-kernel component.

14. The computer of claim 13, wherein the code implementing the byte code interpreter is stored in a portion of the physical memory that is shared by a plurality of non-kernel components.

15. The computer of claim 12, wherein a plurality of non-kernel components are implemented using the shared copy of component code.

16. A non-transitory computer readable medium comprising:
    instructions stored in a cache residing in a kernel space of an operating system;
    instructions stored in a kernel component of a virtual machine residing in the kernel space and configured to load executable applet code for a plurality of applets into the cache in the kernel space, wherein the cache is configured to store the executable applet code and that is shared among the t-he plurality of applets and wherein the executable applet code is a shared copy of executable code that resides in identical locations of a shared portion of a physical memory associated with the kernel component; and
    instructions stored in a non-kernel component of the virtual machine coupled to the kernel component and residing in an address space separate from the kernel space, wherein the non-kernel component accesses hardware of the computer through a kernel of the operating system and is configured to execute the shared executable applet code received from the kernel component in the address space.

17. The non-transitory computer readable medium of claim 16, wherein the non-kernel component is implemented using a shared copy of component code that resides in a shared portion of a physical memory.

* * * * *